United States Patent
Mizunashi et al.

(10) Patent No.: US 8,791,213 B2
(45) Date of Patent: Jul. 29, 2014

(54) CURABLE SILICONE RESIN COMPOSITION

(71) Applicant: Shin-Etsu Chemical Co., Ltd., Tokyo (JP)

(72) Inventors: Tomoyuki Mizunashi, Annaka (JP); Tsutomu Kashiwagi, Annaka (JP); Kinya Kodama, Takasaki (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 13/932,568

(22) Filed: Jul. 1, 2013

(65) Prior Publication Data
US 2014/0024796 A1   Jan. 23, 2014

(30) Foreign Application Priority Data
Jul. 19, 2012   (JP) .................................. 2012-160123

(51) Int. Cl.
*C08L 83/04* (2006.01)

(52) U.S. Cl.
USPC ............... 525/477; 525/478; 528/15; 528/31; 528/32; 528/43

(58) Field of Classification Search
None
See application file for complete search history.

(56) References Cited

U.S. PATENT DOCUMENTS

| | | | | |
|---|---|---|---|---|
| 5,932,668 A * | 8/1999 | Friebe et al. | ................... | 525/478 |
| 6,124,407 A | 9/2000 | Lee et al. | | |
| 7,521,813 B2 * | 4/2009 | Kashiwagi et al. | ........... | 257/791 |
| 8,080,614 B2 * | 12/2011 | Morita et al. | .................. | 525/100 |
| 8,217,388 B2 * | 7/2012 | Kato et al. | ....................... | 257/40 |
| 2009/0118441 A1 | 5/2009 | Yamamoto et al. | | |
| 2011/0254047 A1 * | 10/2011 | Yoshitake et al. | ............ | 257/100 |

FOREIGN PATENT DOCUMENTS

| | | |
|---|---|---|
| JP | A-2005-076003 | 3/2005 |
| JP | A-2006-213789 | 8/2006 |
| JP | A-2007-131694 | 5/2007 |
| JP | A-2008-156578 | 7/2008 |
| JP | A-2011-252175 | 12/2011 |

* cited by examiner

*Primary Examiner* — Marc Zimmer
(74) *Attorney, Agent, or Firm* — Oliff PLC

(57) ABSTRACT

The invention provides a curable silicone resin composition comprising: (A) an organopolysiloxane containing an aromatic group having two or more alkenyl groups, and having a viscosity at 25° C. of 10 to 1,000,000 mPa·s, (B) an organopolysiloxane having a resin structure, comprising 10 to 80 mol % of a $SiO_{4/2}$ unit, 1 to 80 mol % of a $(R^1)_2SiO_{2/2}$ unit, and 1 to 60 mol % of a $(R^2)_3SiO_{1/2}$ unit, and containing a SiOH group in a range of 0.1 to 5.0 mol %, (C) an organohydrogenpolysiloxane having two or more SiH group, and among whole substituents bonded to the silicon atom, 20 to 80 mol % is a phenyl group, and a $SiO_{4/2}$ unit is less than 5 mol %, and (D) a platinum group metal catalyst, and the component (B) is contained in an amount of 20 to 80% by mass based on a sum of the component (A) and the component (B).

4 Claims, No Drawings

CURABLE SILICONE RESIN COMPOSITION

BACKGROUND OF THE INVENTION

1. Field of the Invention

The present invention relates to an addition-curable type curable silicone resin composition.

2. Description of the Related Art

Lenses for light-emitting diode (LED) devices are mass manufactured by mechanical molding such as injection molding. As a lens material for LED, a material having high transparency, high refractive index, having excellent mechanical characteristics, heat resistance, and light resistance has been required. For such a use, an epoxy resin, a poly(meth)acrylate resin and a polycarbonate resin have been conventionally used in many cases, but the currently increasing an output of LED light-emitting devices and the circumstances at high temperatures for a long period of time cause the problem that the thermoplastic resins are insufficient in heat resistance and discoloration resistance.

In addition, lead-free solders are often used in recent years. The lead-free solders have a higher melting point than those of the conventional solders, so that optical devices are usually soldered to substrates while heating at a temperature of 260° C. or higher. When soldering is carried out such a temperature, lenses of prior art thermoplastic resins can no longer be used because inconveniences occur that the lenses will deform or yellow due to high temperature.

Under such a circumstance, a number of studies have been made on the use of silicone resins which are so-called MQ resin comprising an M unit and a Q unit in the lenses associated with LED whereby manufacturing lenses excellent in heat resistance (Patent Documents 1 to 3).

However, the cured product molded by using the silicone resin is hard and weak in cold/heat shock, so that there is a problem that cracks occur due to internal stress by sudden temperature change. To overcome the brittleness of the MQ resin, a vinyl resin into which a T unit such as $PhSiO_{3/2}$ has been introduced and an MQ resin having a SiH group have been used. When the T unit is used, brittleness can be overcome but there are defects that the product is inferior in heat resistance, and colored by heating for a long period of time (Patent Document 4).

Also, there is an example using a silicone resin comprising an M unit, a D unit and a Q unit to improve workability and rubber physical property (Patent Document 5), but there is no resin which satisfies all of high transparency, high refractive index, excellent mechanical properties, heat resistance and light resistance.

PRIOR ART REFERENCES

Patent Documents

Patent Document 1: Japanese Patent Laid-Open Publication No. 2006-213789

Patent Document 2: Japanese Patent Laid-Open Publication No. 2007-131694

Patent Document 3: Japanese Patent Laid-Open Publication No. 2011-252175

Patent Document 4: Japanese Patent No. 4180474

Patent Document 5: Japanese Patent Laid-Open Publication No. 2008-156578

SUMMARY OF THE INVENTION

The present invention has been done in view of the circumstances, and an object thereof is to provide a silicone resin composition which provides a cured product having high refractive index and excellent mechanical properties, and having a characteristic of not broken even by a severe heat cycle test while maintaining high transparency and excellent heat resistance of the MQ resin.

In order to solve the above-described problems, the present invention provides a curable silicone resin composition comprising:

(A) an organopolysiloxane containing an aromatic group having two or more alkenyl groups in one molecule, and having a viscosity at 25° C. of 10 to 1,000,000 mPa·s, (B) an organopolysiloxane having a resin structure, comprising 10 to 80 mol % of a $SiO_{4/2}$ unit, 1 to 80 mol % of a $(R^1)_2SiO_{2/2}$ unit, and 1 to 60 mol % of a $(R^2)_3SiO_{1/2}$ unit, and containing a SiOH group in one molecule in the range of 0.1 to 5.0 mol %, wherein each $R^1$ independently represent an alkenyl group having 2 to 8 carbon atoms, or a substituted or unsubstituted monovalent hydrocarbon group containing no aliphatic unsaturated group, each $R^2$ independently represent an alkenyl group having 2 to 8 carbon atoms, or a substituted or unsubstituted monovalent hydrocarbon group containing no aliphatic unsaturated group, and among the whole $R^2$s contain one or more alkenyl groups, (C) an organohydrogenpolysiloxane having two or more hydrogen atoms (SiH group) bonded to a silicon atom in one molecule, and among the whole substituents bonded to the silicon atoms, 20 to 80 mol % is a phenyl group, and a $SiO_{4/2}$ unit is less than 5 mol %, and (D) a platinum group metal catalyst, and the component (B) is contained in an amount of 20 to 80% by mass based on a sum of the component (A) and the component (B).

Such a curable silicone resin composition of the present invention becomes a cured product having a high refractive index and excellent mechanical properties, and having a characteristic that it is not broken by a severe heat cycle test while maintaining high transparency and excellent heat resistance of the MQ resin.

It is preferred that a refractive index of the cured product formed by using the curable silicone resin composition of the present invention is in the range of 1.50 to 1.60.

When a refractive index of the cured product formed by using the curable silicone resin composition of the present invention is in the range of 1.50 to 1.60, then the cured product can be preferably used as a lens material.

Moreover, a SiH group of the component (C) is preferably contained in an amount of 0.1 to 4.0 mol based on 1 mol of the alkenyl group of the component (A) and the component (B).

When an amount of the SiH group of the component (C) is in the range of 0.1 to 4.0 mol, the curing reaction proceeds sufficiently, so that a silicone rubber cured product can be easily obtained from the curable silicone resin composition of the present invention. Also, an amount of an unreacted SiH group remained in the cured product can be suppressed to a little amount whereby a cured product which difficultly causes change in rubber physical property with passage of time can be obtained.

As explained above, the curable silicone resin composition of the present invention is extremely useful as a silicone resin composition which provides a cured product having high refractive index and excellent mechanical properties, and having a characteristic not broken by a severe heat cycle test while maintaining high transparency and excellent heat resistance of the MQ resin.

DETAILED DESCRIPTION OF THE PREFERRED EMBODIMENTS

Hereinafter, the present invention is explained in more detail.

As mentioned above, there is no cured product molded by using the conventional silicone resin which satisfies all of high transparency, high refractive index, excellent mechanical properties, heat resistance, and light resistance.

The present inventors have intensively studied to accomplish the problems, and as a result, they have found that a curable silicone resin composition containing the following components (A) to (D) gives a product having high refractive index, excellent mechanical properties, a characteristic not broken by a severe heat cycle test while maintaining high transparency, and excellent heat resistance, whereby accomplished the present invention.

That is, the curable silicone resin composition of the present invention comprising (A) an organopolysiloxane containing an aromatic group having two or more alkenyl groups in one molecule, and having a viscosity at 25° C. of 10 to 1,000,000 mPa·s, (B) an organopolysiloxane having a resin structure, comprising 10 to 80 mol % of a $SiO_{4/2}$ unit, 1 to 80 mol % of a $(R^1)_2SiO_{2/2}$ unit, and 1 to 60 mol % of a $(R^2)_3SiO_{1/2}$ unit, and containing a SiOH group in one molecule in the range of 0.1 to 5.0 mol %, wherein each $R^1$ independently represent an alkenyl group having 2 to 8 carbon atoms, or a substituted or unsubstituted monovalent hydrocarbon group containing no aliphatic unsaturated group, each $R^2$ independently represent an alkenyl group having 2 to 8 carbon atoms, or a substituted or unsubstituted monovalent hydrocarbon group containing no aliphatic unsaturated group, and among the whole $R^2$s contain one or more alkenyl groups, (C) an organohydrogenpolysiloxane having two or more hydrogen atoms (SiH group) bonded to a silicon atom in one molecule, and among the whole substituents bonded to the silicon atoms, 20 to 80 mol % is a phenyl group, and a $SiO_{4/2}$ unit is less than 5 mol %, and (D) a platinum group metal catalyst, and the component (B) is contained in an amount of 20 to 80% by mass based on the sum of the component (A) and the component (B).

In the following, each component is explained in detail.
<Component (A): Organopolysiloxane Containing Aromatic Group>

The organopolysiloxane containing an aromatic group which is a base component of the present invention is an organopolysiloxane having 2 or more aliphatic unsaturated bonds in one molecule, particularly represented by an alkenyl group having 2 to 8 carbon atoms, particularly 2 to 6 carbon atoms such as a vinyl group and an allyl group, and has a viscosity at 25° C. of 10 to 1,000,000 mPa·s, particularly 100 to 500,000 mPa·s. Among these, a linear organopolysiloxane having at least one alkenyl group on each of the silicon atoms at the both terminals of the molecular chain and represented by the following formula (1) is preferred since a viscosity at 25° C. is 10 to 1,000,000 mPa·s, in the viewpoints of workability and curability. If the viscosity is lower than the range, it is not preferred since molding becomes difficult, while if it is higher than the range, it is not preferred since handling is difficult and it becomes an occurrence of voids. Incidentally, the linear organopolysiloxane may contain a small amount of a branched structure (tri-functional siloxane unit) in the molecular chain.

Incidentally, a viscosity of this composition and each component is a value measured at 25° C. by using a rotary viscometer.

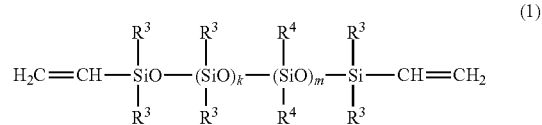
(1)

wherein each $R^3$ may be the same or different and represent an unsubstituted or substituted monovalent hydrocarbon group, each $R^4$ may be the same or different and represent an unsubstituted or substituted monovalent hydrocarbon group containing no aliphatic unsaturated bond, and contains at least one aromatic group, and "k" and "m" represent each 0 or a positive integer.

Here, the monovalent hydrocarbon group represented by $R^3$ is preferably those having 1 to 10 carbon atoms, particularly 1 to 6 carbon atoms, and specifically exemplified by an alkyl group such as a methyl group, an ethyl group, a propyl group, an isopropyl group, a butyl group, an isobutyl group, a tert-butyl group, a pentyl group, a neopentyl group, a hexyl group, a cyclohexyl group, an octyl group, a nonyl group, and a decyl group; an aryl group such as a phenyl group, a tolyl group, a xylyl group, and a naphthyl group; an aralkyl group such as a benzyl group, phenylethyl group, and phenylpropyl group; an alkenyl group such as a vinyl group, an allyl group, a propenyl group, an isopropenyl group, a butenyl group, a hexenyl group, a cyclohexenyl group, and an octenyl group; or those in which a part or whole of the hydrogen atom(s) of these groups is/are substituted by a halogen atom such as fluorine, bromine and chlorine, or by a cyano group, for example, a halogen-substituted alkyl group such as a chloromethyl group, a chloropropyl group, a bromoethyl group and a trifluoropropyl group, or a cyanoethyl group.

Also, as the monovalent hydrocarbon group represented by $R^4$, those having 1 to 10 carbon atoms, particularly 1 to 6 carbon atoms are preferred, and the same specific examples as the $R^3$ can be exemplified, but the alkenyl group is excluded.

The "k" and "m" represent each 0 or a positive integer, preferably 0 or a positive integer satisfying $0<k+m\leq10,000$, more preferably $5\leq k+m\leq2,000$, and an integer satisfying $0<k/(k+m)\leq0.2$.

Also, a ratio of a number of the siloxane unit in which an aryl group is bonded to a silicon atom based on the whole siloxane units in the component (A) is preferably 10% or more and 80% or less, more preferably 30% or more and 75% or less, further preferably 40% or more and 70% or less. If the ratio is within the range, it is preferred since the composition has a high refractive index and a viscosity easily handled. The aryl group is preferably a phenyl group, a tolyl group and a benzyl group, particularly preferably a phenyl group.

The component (A) may be specifically exemplified by the following,

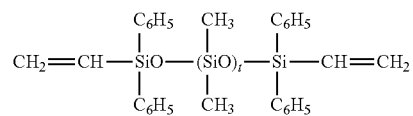

-continued

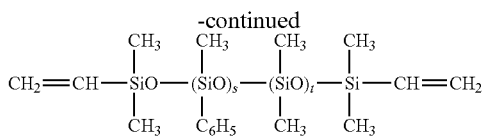

wherein "s" and "t" represent each an integer of 8 to 2,000.

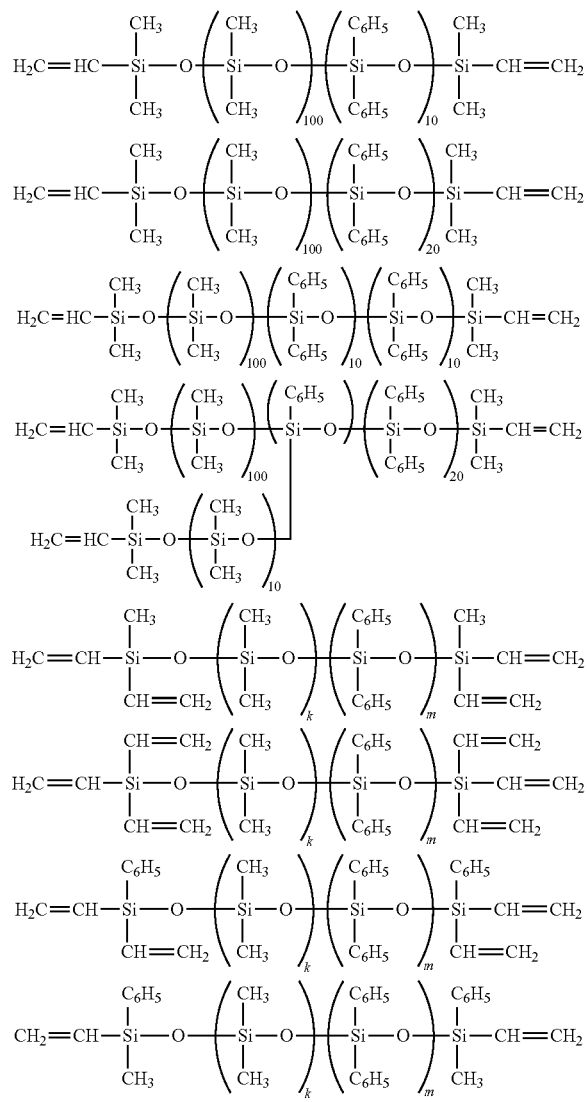

wherein "k" and "m" have the same meanings as defined above.

<Component (B): Organopolysiloxane with a Resin Structure>

The organopolysiloxane with a resin structure (i.e., a three-dimensional network structure) which is a base component of the present invention comprises 10 to 80 mol % of a $SiO_{4/2}$ unit, 1 to 80 mol % of a $(R^1)_2SiO_{2/2}$ unit and 1 to 60 mol % of a $(R^2)_3SiO_{1/2}$ unit, and contains a SiOH group in the range of 0.1 to 5.0 mol % in one molecule.

In the formulae, each $R^1$ independently represent an alkenyl group having 2 to 8 carbon atoms, or a substituted or unsubstituted monovalent hydrocarbon group containing no aliphatic unsaturated group, each $R^2$ independently represent an alkenyl group having 2 to 8 carbon atoms, or a substituted or unsubstituted monovalent hydrocarbon group containing no aliphatic unsaturated group, and among the whole $R^2$s, at least one of which is an alkenyl group.

The alkenyl group represented by the $R^1$ and $R^2$ has 2 to 8 carbon atoms, and preferred examples of which may be exemplified by a vinyl group and an allyl group. In addition, 1 to 50 mol % of the whole $R^1$ and $R^2$, preferably 2 to 30 mol % thereof, more preferably 3 to 20 mol % thereof can be an alkenyl group.

Examples of the substituted or unsubstituted monovalent hydrocarbon group containing no aliphatic unsaturated group represented by the $R^1$ and $R^2$ may be exemplified by a lower alkyl group such as a methyl group, an ethyl group, a propyl group, and a butyl group; a cycloalkyl group such as a cyclohexyl group; an aryl group such as a phenyl group, a tolyl group, and a xylyl group; an aralkyl group such as a benzyl group; and a group in which a part or whole of the hydrogen atom of these hydrocarbon groups is/are substituted by a halogen atom or a cyano group, for example, a chloromethyl group, a cyanoethyl group and a 3,3,3-trifluoropropyl group. Among these, those having 1 to 10 carbon atoms, particularly in the range of 1 to 6 carbon atoms are suitable. Also, among the whole $R^1$s and $R^2$s, preferably at least one of which, more preferably 1 to 90 mol % of which, more preferably 10 to 80 mol % of which, particularly preferably 20 to 70 mol % of which can be a phenyl group.

The component (B) may be used a single kind alone or two or more kinds in combination, and contained in an amount of 20 to 80% by mass based on the sum of the component (A) and the component (B). A weight average molecular weight (hereinafter, it is called "Mw") of the component (B) is preferably 1,000 to 10,000, more preferably 1,200 to 9,500, further preferably 1,500 to 9,000. If Mw is 1,000 or more, storage stability becomes good and mechanical characteristics of the cured product is good, and if Mw is 10,000 or less, the viscosity is not too high so that handling thereof is easy whereby it is preferred.

Incidentally, the Mw referred to in the present specification means an Mw measured by gel permeation chromatography (GPC) under the following conditions and using polystyrene as a standard substance.

[Measurement Conditions]
Eluent: THF
Flow amount: 0.6 mL/min
Detector: Differential refractive index detector (RI)
Column: TSK Guard column Super H-L
TSK gel Super H4000 (6.0 mm I.D.×15 cm×1)
TSK gel Super H3000 (6.0 mm I.D.×15 cm×1)
TSK gel Super H2000 (6.0 mm I.D.×15 cm×2)
(Products from Tosoh Corporation)
Column temperature: 40° C.
Sample injection amount: 20 μL (a THF solution with a concentration of 0.5% by mass)

In the component (B), an amount of a hydroxyl group (SiOH group) bonded to a silicon atom measured by $^1$H-NMR is preferably in the range of 0.1 mol % to 5.0 mol % in one molecule, particularly preferably 0.2 mol % to 3.0 mol %. If the amount of the hydroxyl group is less than 0.1 mol %, adhesive property becomes worse, while if it exceeds 5.0 mol %, condensation proceeds with passage of time whereby storage stability is lowered. Also, an amount of an alkoxy group (preferably an alkoxy group having 1 to 6 carbon atoms such as a methoxy group, an ethoxy group and an isopropoxy group) bonded to a silicon atom is preferably in the range of 0.01 mol % to 10 mol %, more preferably 0.05 mol % to 8 mol %, further preferably 0.1 mol % to 5 mol %. With regard to the lower limit of the amount of the alkoxy group, the amount of the alkoxy group is desirably as low as possible, but it is difficult to be completely 0, whereby at least the lower limit of the alkoxy group is remained. If the amount of the alkoxy group is 10 mol % or less, storage stability is not worsened so that it is preferred.

The component (B) can be easily synthesized by mixing the compounds each become a unit source with a molar ratio in the above-mentioned range, and, for example, subjecting to co-hydrolysis in the presence of an acid. Here, the $SiO_{4/2}$ unit source may be exemplified by, for example, sodium silicate, alkylsilicates, polyalkylsilicates and silicon tetrachloride. Also, the $(R^1)_2SiO_{2/2}$ unit source may be exemplified by an organic silicon compound, for example, diorganochlorosilanes and diorganoalkoxysilanes represented by the following structural formulae, but the usable $(R^1)_2SiO_{2/2}$ unit source is not limited by these.

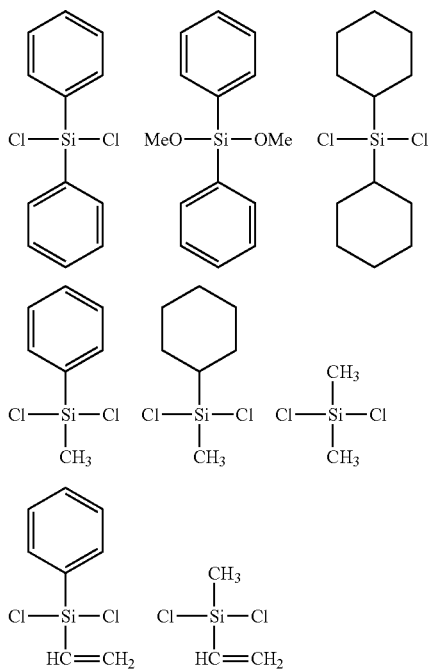

The $(R^2)_3SiO_{1/2}$ unit source may be exemplified by an organic silicon compound, for example, triorganochlorosilane, triorganoalkoxysilane, and hexaorganodisiloxane represented by the following structural formulae, but the usable $(R^2)_3SiO_{1/2}$ unit source is not limited by these.

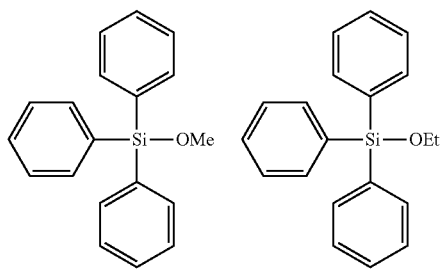

-continued

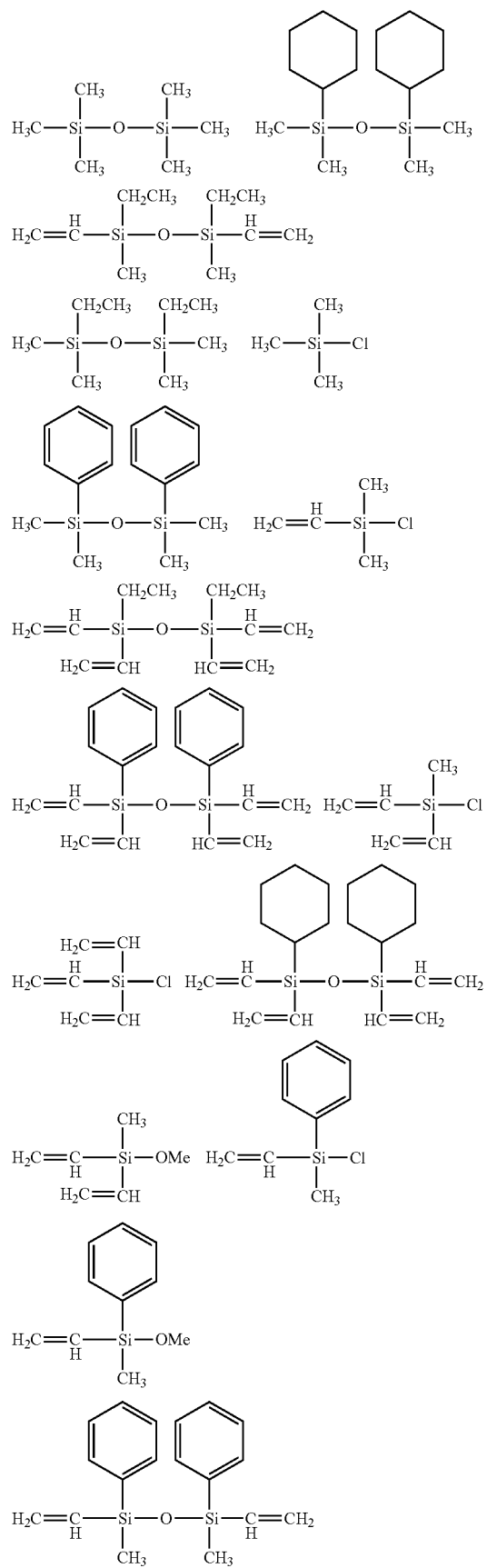

-continued

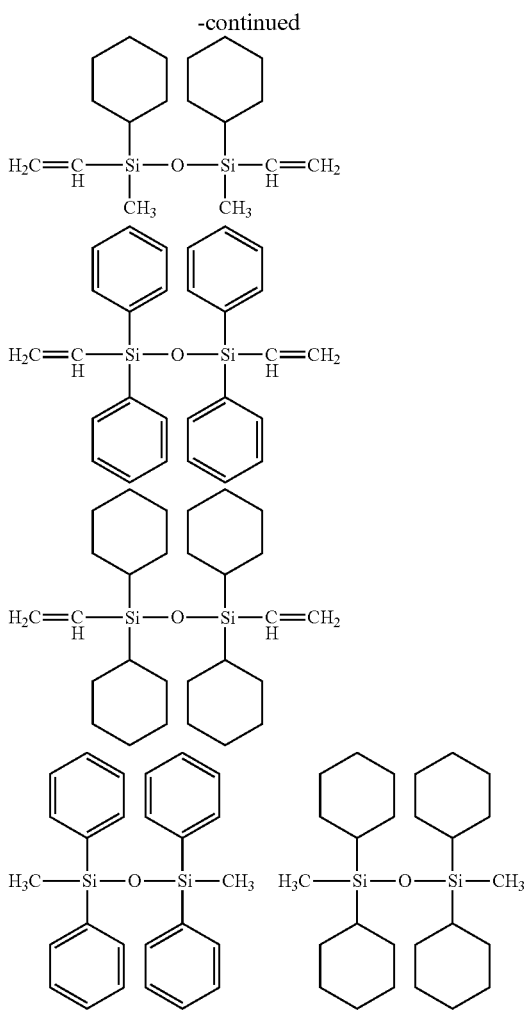

<Component (C): Organohydrogenpolysiloxane>

The organohydrogenpolysiloxane which is a basic component of the present invention has two or more hydrogen atoms (SiH group) bonded to a silicon atom in one molecule, and among whole substituents bonded to the silicon atoms, 20 to 80 mol % is a phenyl group, and a $SiO_{4/2}$ unit is less than 5 mol %. The component (C) is a material which acts as a crosslinking agent, and the SiH group in the component (C) and the alkenyl group (preferably a vinyl group and/or an allyl group) bonded to the silicon atom in the component (A) and the component (B) are subjected to addition reaction to form a cured product from the curable silicone resin composition of the present invention. The molecular structure of the component (C) may be either a linear, a branched chain, a cyclic, a cyclic having a branch, or a network structure. The position of the SiH group is not particularly limited, and when the component (C) has terminal portions of the molecular chain, the SiH group may exist at either one of the terminal portions of the molecular chain or the non-terminal portions of the molecular chain, or may exist at the both portions. The component (C) may be used a single kind alone or two or more kinds in combination.

Among the constitutional units of the component (C), when the $SiO_{4/2}$ unit is contained in an amount of 5 mol % or more in the component (C), the viscosity of the composition after mixing increases, and handling thereof becomes difficult. Moreover, after curing by heating, the product is hard and brittle so that it is not preferred. If an amount thereof is less than 5 mol %, excellent strength and rubbery characteristics can be maintained so that it is preferred, and more preferably the unit is not at all contained.

The component (C) contains 20 to 80 mol % of the phenyl group, preferably 30 to 60 mol % of the same based on the whole substituents bonded to the silicon atom.

When the content of the phenyl group is in the range, the cured product is excellent in curing characteristics and has high refractive index, so that it can contribute to improve light-emission efficiency.

The component (C) may be mentioned, for example, an organohydrogenpolysiloxane represented by the following average composition formula (2), and having at least two SiH groups in one molecule, preferably three or more (for example, 3 to 200, more preferably 4 to 100 or so). The positions of the SiH groups are not particularly limited, and may be at the terminal of the molecule or in the course of the same,

  (2)

wherein $R^5$s may be the same or different and each represent an unsubstituted or substituted monovalent hydrocarbon group containing no aliphatic unsaturated bond, and "d" and "e" represent numbers satisfying $0.001 \leq d < 2$, $0.7 \leq e \leq 2$, and $0.8 \leq d+e \leq 3$.

Here, $R^5$ in the average composition formula (2) each may be mentioned the same or different and unsubstituted or substituted monovalent hydrocarbon group preferably having 1 to 10 carbon atoms, particularly preferably having 1 to 7 carbon atoms containing no aliphatic unsaturated bond. Examples thereof may be mentioned the functional groups exemplified in the substituent $R^3$ in the formula (1) other than the alkenyl group, for example, a lower alkyl group such as a methyl group, and an aryl group such as a phenyl group.

Also, "d" and "e" in the average composition formula (2) represent numbers satisfying $0.001 \leq d < 2$, $0.7 \leq e \leq 2$, and $0.8 \leq d+e \leq 3$, preferably numbers satisfying $0.05 \leq d < 1$, $0.8 \leq e \leq 2$, and $1 \leq d+e \leq 2.7$. The number of the silicon atoms in the organohydrogenpolysiloxane of the component (C) is generally 2 to 300, preferably 3 to 200, more preferably 4 to 100, and which is suitably used.

The component (C) may be exemplified by tris(hydrogendimethylsiloxy)phenylsilane, 1-phenyl-3,5,7-trimethyl-cyclotetrasiloxane, both terminals trimethylsiloxy group-terminated methyl hydrogen siloxane.diphenylsiloxane copolymer, both terminals trimethylsiloxy group-terminated methyl hydrogen siloxane.diphenylsiloxane.dimethylsiloxane copolymer, a copolymer comprising a $(CH_3)_2HSiO_{1/2}$ unit, a $(C_6H_5)_2SiO_{2/2}$ unit and a $CH_3SiO_{3/2}$ unit; and a copolymer comprising a $SiO_{4/2}$ unit, a $(C_6H_5)_2SiO_{2/2}$ unit, a $(C_6H_5)(CH_3)_2SiO_{1/2}$ unit and a $(CH_3)_2HSiO_{1/2}$ unit, or comprising either of these units, but the present invention is not limited by these.

The component (C) can be generally obtained by hydrolyzing $R^5SiHCl_2$, $(R^5)_3SiCl$, $(R^5)_2SiCl_2$ or $(R^5)_2SiHCl$ ($R^5$ has the same meaning as defined above), or equilibrating the siloxane obtained by hydrolysis.

An amount of the component (C) to be formulated is such an amount that an amount of the SiH group in the component (C) becomes preferably 0.1 to 4.0 mol, more preferably 0.3 to 3.0 mol based on a total 1 mol of the aliphatic unsaturated bond represented by the alkenyl group bonded to the silicon atom in the component (A) and the alkenyl group (preferably a vinyl group and/or an allyl group) bonded to the silicon atom in the component (B). If the amount to be formulated is in the range, the curing reaction sufficiently proceeds so that a silicone rubber cured product can be easily obtained from the curable silicone resin composition of the present invention. Also, an amount of an unreacted SiH group remained in the cured product can be suppressed to a little amount and change in rubber physical property with passage of time is difficultly caused so that it is suitable.

<Component (D): Platinum Group Metal Catalyst>

Component (D) is to be formulated to cause an addition-curable reaction of the composition of the present invention, and there are a platinum series, a palladium series and a rhodium series material. In view of the cost, there may be exemplified by a platinum series material such as platinum, platinum black and chloroplatinic acid, for example, $H_2PtCl_6 \cdot mH_2O$, $K_2PtCl_6$, $KHPtCl_6 \cdot mH_2O$, $K_2PtCl_4$, $K_2PtCl_4 \cdot mH_2O$, and $PtO_2 \cdot mH_2O$ (where "m" represents a positive integer), and a complex of them with a hydrocarbon such as an olefin, an alcohol or an organopolysiloxane containing a vinyl group, and these may be used a single kind alone or two or more kinds in combination. An amount of these catalyst components to be formulated may be the so-called catalytic amount, and it is generally used in the range of 0.1 to 1,000 ppm, preferably 0.5 to 200 ppm in terms of a platinum group metal (weight) based on the total amount of the components (A) to (C). If the amount of the catalyst is the lower limit or more, hydrosilylation easily proceeds and curing failure difficultly occurs, while if it is the upper limit or less, coloring is difficultly generated.

<Other Components>

In addition, to the curable silicone resin composition of the present invention may be formulated, other than the components (A) to (D), various kinds of adhesion promoters or additives which have been well known can be formulated, if necessary. For example, the adhesion promoter may be mentioned vinyltrimethoxysilane, vinyltriethoxysilane, 2-(3,4-epoxycyclohexyl)ethyltrimethoxysilane, 3-glycidoxypropyltrimethoxysilane, 3-glycidoxypropylmethyldiethoxysilane, 3-glycidoxypropyltriethoxysilane, 3-methacryloxypropylmethyldiethoxysilane, 3-methacryloxypropyltriethoxysilane, N-2-(aminoethyl)-3-aminopropylmethyldimethoxysilane, N-2-(aminoethyl)-3-aminopropyltrimethoxysilane, N-2-(aminoethyl)-3-amino-propyltriethoxysilane, N-phenyl-3-aminopropyltrimethoxysilane, 3-mercaptopropyltrimethoxysilane, and the like, or trimethoxysilane, tetramethoxysilane and an oligomer thereof, and the like. These adhesion promoters may be used a single kind alone or two or more kinds in combination. The adhesion promoter is preferably formulated in an amount of 0 to 10% by mass, particularly 0 to 5% by mass based on the total weight of the components (A) to (D).

The additives may be mentioned, for example, a reinforcing inorganic filler such as fumed silica and fumed titanium dioxide; and a non-reinforcing inorganic filler such as calcium carbonate, calcium silicate, titanium dioxide, ferric oxide, carbon black and zinc oxide, and is optionally formulated in an amount of 600 parts by mass or less (for example, 0 to 600 parts by mass, generally 1 to 600 parts by mass, more preferably 10 to 400 parts by mass or so) based on the total 100 parts by mass of the components (A) to (D).

The curable silicone resin composition of the present invention can be prepared by mixing the respective components uniformly, but in general, they are stored by dividing into two-component type composition so as not to proceed the curing reaction, and the composition is mixed at the time of using to carry out the curing reaction. In this case, it is necessary to separate the component (C) and the component (D) when storing. Of course, it is possible to add a curing retarder such as acetylene alcohols to the mixture with a small amount to use the mixture as one-component type composition.

The curable silicone resin composition of the present invention can be used by coating on a predetermined substrate depending on the usage and then cured. The curing conditions may be a normal temperature (25° C.) which gives sufficient curing, and may be cured by heating, if necessary. The temperature when it is cured under heating may be, for example, 60 to 200° C.

The curable silicone resin composition of the present invention immediately cures by heating, if necessary, to form an elastic cured product having high hardness and excellent in strength. The cured product can be widely used for the uses which involve the problem that a silicone cured product causes cracks due to temperature change. More specifically, the cured product can be used, for example, as a protective coating agent for electric and electronic devices and optoelectronic devices, a molding agent and a lens material, and for potting and casting for these devices, and further for surface coating of a silicone rubber keyboard.

The refractive index of the cured product obtained by curing the composition of the present invention is preferably in the range of 1.50 to 1.60. When it is in the range, the cured product can be used suitably for a lens material.

EXAMPLES

Hereinafter, the present invention is explained more specifically by referring to Examples and Comparative Examples, but the present invention is not limited by the following Examples. Incidentally, in the following examples, all parts mean parts by mass. Further, "Me" represents a methyl group, "Vi" represents a vinyl group, and "Ph" represents a phenyl group.

Also, the viscosity in Examples is a value measured at 25° C. by using a rotary viscometer.

Example 1

To 50 parts of (A) an organopolysiloxane (viscosity: 4,000 mPa·s) represented by the formula,

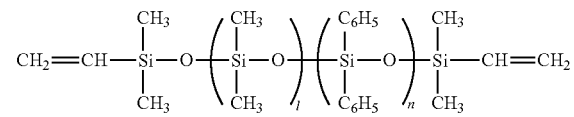

wherein l=68 and n=30, were added 50 parts of (B) a resin structure vinyl-phenyl-methyl polysiloxane (PVMQ) comprising 46 mol % of a $SiO_{4/2}$ unit, 20 mol % of a $Ph_2SiO_{2/2}$ unit, 10 mol % of a $MePhViSiO_{1/2}$ unit and 24 mol % of a $Me_2PhSiO_{1/2}$ unit (Mw=2500, a hydroxyl group amount: 0.4 mol %, an alkoxy group amount: MeO group=0.9 mol % and PrO group=0.2 mol %), (C) an organohydrogenpolysiloxane represented by the following formula,

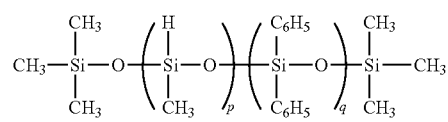

wherein p=38 and q=17, wherein a SiH group amount became 1.1 mol based on a total 1 mol of the vinyl group bonded to the silicon atoms in the components (A) and (B) (a ratio of the SiH group to the vinyl group is sometimes shown as "SiH/SiVi"), and, 0.05 part of (D) an octyl alcohol-modified solution containing chloroplatinic acid (amount of platinum element: 2% by mass), and the mixture was well stirred to prepare a silicone rubber composition. This composition was molded by heating at 150° C. for 4 hours to form a cured product.

Example 2

To 50 parts of (A) the organopolysiloxane (viscosity: 4,000 mPa·s) which is the same as that used in Example 1 were added 50 parts of (B) a resin structure vinyl-phenyl-methyl polysiloxane (PVMQ) comprising 40 mol % of a $SiO_{4/2}$ unit, 40 mol % of a $Ph_2SiO_{2/2}$ unit, 10 mol % of a $MePhViSiO_{1/2}$ unit and 10 mol % of a $Me_2PhSiO_{1/2}$ unit (Mw=2,800, a hydroxyl group amount: 0.5 mol %, an alkoxy group amount: MeO group=0.6 mol % and PrO group=0.2 mol %), (C) an organohydrogenpolysiloxane which is the same as that used in Example 1 wherein a SiH group amount became 1.1 mol based on a total 1 mol of the vinyl group bonded to the silicon atoms in the components (A) and (B), and, 0.05 part of (D) an octyl alcohol-modified solution containing chloroplatinic acid (amount of platinum element: 2% by mass), and the mixture was well stirred to prepare a silicone rubber composition. In the same manner as in Example 1, a cured product was formed from the composition, and its physical properties were measured.

Example 3

To 50 parts of (A) an organopolysiloxane (viscosity: 9,000 mPa·s) represented by the formula,

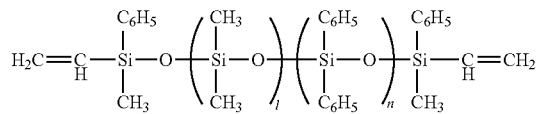

wherein l=13 and n=15,
were added 50 parts of (B) a vinyl-phenyl-methyl polysiloxane (PVMQ) which is the same as that used in Example 1, (C) an organohydrogenpolysiloxane which is the same as that used in Example 1 wherein a SiH group amount became 1.1 mol based on a total 1 mol of the vinyl group bonded to the silicon atoms in the components (A) and (B), and, 0.05 part of (D) an octyl alcohol-modified solution containing chloroplatinic acid (amount of platinum element: 2% by mass), and the mixture was well stirred to prepare a silicone rubber composition. In the same manner as in Example 1, a cured product was formed from the composition, and its physical properties were measured.

Example 4

To 50 parts of (A) the organopolysiloxane (viscosity: 9,000 mPa·s) which is the same as that used in Example 3 were added 50 parts of (B) a vinyl-phenyl-methyl polysiloxane (PVMQ) which is the same as that used in Example 2, (C) the organohydrogenpolysiloxane which is the same as that used in Example 1 wherein a SiH group amount became 1.1 mol based on a total 1 mol of the vinyl group bonded to the silicon atoms in the components (A) and (B), and, 0.05 part of (D) an octyl alcohol-modified solution containing chloroplatinic acid (amount of platinum element: 2% by mass), and the mixture was well stirred to prepare a silicone rubber composition. In the same manner as in Example 1, a cured product was formed from the composition, and its physical properties were measured.

Comparative Example 1

To 50 parts of (A) the organopolysiloxane which is the same as that used in Example 1 were added 50 parts of (B') a resin structure vinyl-phenyl-methyl polysiloxane (PVMQ) comprising 50 mol % of a $SiO_{4/2}$ unit, 15 mol % of a $MePhViSiO_{1/2}$ unit and 35 mol % of a $Me_3SiO_{1/2}$ unit (Mw=3,000, a hydroxyl group amount: 0.05 mol %, an alkoxy group amount: MeO group=0.05 mol % and PrO group=0.01 mol %), (C) the organohydrogenpolysiloxane which is the same as that used in Example 1 wherein a SiH group amount became 1.1 mol based on a total 1 mol of the vinyl group bonded to the silicon atoms in the components (A) and (B'), and, 0.05 part of (D) an octyl alcohol-modified solution containing chloroplatinic acid (amount of platinum element: 2% by mass), and the mixture was well stirred to prepare a silicone rubber composition. In the same manner as in Example 1, a cured product was formed from the composition, and its physical properties were measured.

Comparative Example 2

To 50 parts of (A) the organopolysiloxane which is the same as that used in Example 1 were added, 50 parts of (B') a resin structure PVMQ comprising 46 mol % of a $SiO_{4/2}$ unit, 20 mol % of a $Ph_2SiO_{2/2}$ unit, 10 mol % of a $MePhViSiO_{1/2}$ unit and 24 mol % of a $Me_2PhSiO_{1/2}$ unit (Mw=2,400, a hydroxyl group amount: 0.05 mol %, an alkoxy group amount: MeO group=0.1 mol % and PrO group=0.01 mol %), (C) the organohydrogenpolysiloxane which is the same as that used in Example 1 wherein a SiH group amount became 1.1 mol based on a total 1 mol of the vinyl group bonded to the silicon atoms in The components (A) and (B'), and, 0.05 part of (D) an octyl alcohol-modified solution containing chloroplatinic acid (amount of platinum element: 2% by mass), and the mixture was well stirred to prepare a silicone rubber composition. In the same manner as in Example 1, a cured product was formed from the composition, and its physical properties were measured.

Comparative Example 3

To 50 parts of (A) the organopolysiloxane which is the same as that used in Example 1 were added 50 parts of (B') a resin structure vinyl-phenyl-methyl polysiloxane (PVMQ) comprising 70 mol % of a $PhSiO_{3/2}$ unit, 10 mol % of a $MePhViSiO_{1/2}$ unit and 20 mol % of a $Me_2PhSiO_{1/2}$ unit (Mw=3,000, a hydroxyl group amount: 0.1 mol %, an alkoxy group amount: MeO group=0.3 mol % and PrO group=0.03 mol %), (C) the organohydrogenpolysiloxane which is the same as that used in Example 1 wherein a SiH group amount became 1.1 mol based on a total 1 mol of the vinyl group bonded to the silicon atoms in the components (A) and (B'), and, 0.05 part of (D) an octyl alcohol-modified solution containing chloroplatinic acid (amount of platinum element: 2% by mass), and the mixture was well stirred to prepare a silicone rubber composition. In the same manner as in Example 1, a cured product was formed from the composition, and its physical properties were measured.

Comparative Example 4

To 50 parts of (A) the organopolysiloxane which is the same as that used in Example 1 were added 50 parts of (B') a resin structure vinyl-phenyl-methyl polysiloxane (PVMQ) comprising 46 mol % of a $SiO_{4/2}$ unit, 20 mol % of a $Ph_2SiO_{2/2}$ unit, 10 mol % of a $MePhViSiO_{1/2}$ unit and 24 mol % of a $Me_2PhSiO_{1/2}$ unit (Mw=800, a hydroxyl group amount: 8 mol %, an alkoxy group amount: MeO group=4 mol % and PrO group=0.5 mol %), (C) the organohydrogenpolysiloxane which is the same as that used in Example 1 wherein a SiH group amount became 1.1 mol based on a total 1 mol of the vinyl group bonded to the silicon atoms in the components (A) and (B'), and, 0.05 part of (D) an octyl alcohol-modified solution containing chloroplatinic acid (amount of platinum element: 2% by mass), and the mixture was well stirred to prepare a silicone rubber composition. In the same manner as in Example 1, a cured product was formed from the composition, and its physical properties were measured.

Physical properties of Examples and Comparative Examples were measured by the methods shown below.

Measurement of refractive index: A refractive index of the composition was measured by an Abbe type refractometer at 25° C.

Tensile test: According to JIS K 6249, tensile strength and elongation at break of the cured product with a thickness of 1 mm and a width of 1 cm were measured.

Hardness: It was measured by using a Type A hardness meter.

Surface tackiness: It was confirmed by finger touch.

Thermal shock test: A sample obtained by enclosing the silicone rubber composition in an aluminum dish (a diameter: 6 cm, a depth: 0.6 mm) and curing the same was injected into −50° C. to 150° C. cooling/heating cycle (an operation of allowing to stand at −50° C. for 30 minutes, and then allowing to stand in a thermostat chamber at 150° C. for 30 minutes is one cycle and this is repeated), and presence or absence of generating cracks was confirmed.

Light transmittance: A cured product with a thickness of 1 mm was prepared, and light transmittance (450 nm) was measured by using Hitachi Spectrophotometer U-4100 as an initial stage transmittance, thereafter, the cured product was treated at 150° C. for 1000 hours, and the light transmittance was similarly measured.

Adhesion test: The cured product was broken by using a microspatula, and when the cured product was taken off from the substrate, a ratio of the cohesive failure portion and the peeled off portion was observed to judge the adhesiveness.

Judgment Criteria

○: well adhered (a rate of cohesive failure is 80% or more)
Δ: partially adhered (a rate of cohesive failure is 80 to 20% or more)
x: not adhered (a rate of cohesive failure is 20% or less)

With regard to the respective measured results, Examples are shown in Table 1, and Comparative Examples are shown in Table 2.

TABLE 1

| | Example | | | |
|---|---|---|---|---|
| | 1 | 2 | 3 | 4 |
| SiH/SiVi | 1.1 | 1.1 | 1.1 | 1.1 |
| Curing conditions | 150° C./ 4 hours | 150° C./ 4 hours | 150° C./ 4 hours | 150° C./ 4 hours |
| Refractive index | 1.52 | 1.54 | 1.55 | 1.56 |
| Light transmittance (450 nm) | 100 | 100 | 100 | 100 |
| Light transmittance (after 150° C. · 1000 hours, 450 nm) | 96 | 95 | 95 | 95 |
| Hardness (Type A) | 63 | 70 | 68 | 70 |
| Elongation at break (%) | 50 | 80 | 60 | 80 |
| Tensile strength (MPa) | 1.5 | 1.7 | 1.7 | 2.0 |
| Adhesiveness (Aluminum substrate) | ○ | ○ | ○ | ○ |
| Adhesion of dust by surface tackiness | None | None | None | None |
| Thermal shock test (−50° C. to 150° C., 1000 cycles) | No crack | No crack | No crack | No crack |

TABLE 2

| | Comparative Example | | | |
|---|---|---|---|---|
| | 1 | 2 | 3 | 4 |
| SiH/SiVi | 1.1 | 1.1 | 1.1 | 1.1 |
| Curing conditions | 150° C./ 4 hours | 150° C./ 4 hours | 150° C./ 4 hours | 150° C./ 4 hours |
| Refractive index | 1.49 | 1.53 | 1.56 | 1.54 |
| Light transmittance (450 nm) | 100 | 100 | 97 | 100 |
| Light transmittance (after 150° C. · 1000 hours, 450 nm) | 96 | 95 | 75 | 95 |
| Hardness (Type A) | 65 | 65 | 80 | 30 |
| Elongation at break (%) | 30 | 20 | 30 | 70 |
| Tensile strength (MPa) | 1.9 | 1.6 | 1.9 | 1.0 |
| Adhesiveness (Aluminum substrate) | ○ | x | ○ | ○ |
| Adhesion of dust by surface tackiness | None | None | None | Present |
| Thermal shock test (−50° C. to 150° C., 1000 cycles) | Crack occurred with 2 cycles | Crack occurred with 2 cycles | No crack | No crack |

As shown in Table 1, Examples 1 to 4 gave cured products having sufficient hardness, good refractive index and light transmittance, and excellent mechanical properties, and no generation of cracks by the thermal shock test was observed.

On the other hand, as shown in Table 2, Comparative Example 1 was a product inferior in refractive index and mechanical characteristics of the cured product, and crack was caused by the thermal shock test. Comparative Example 2 gave a product having good refractive index of the cured product, but inferior in mechanical characteristics of the same, and crack was caused by the thermal shock test. Comparative Example 3 was a product inferior in light transmittance and mechanical characteristics of the cured product. Comparative Example 4 was a product inferior in hardness of the cured product and mechanical characteristics.

Incidentally, Comparative Example 1 is a sample which does not contain a $(R^1)_2SiO_{2/2}$ unit corresponding to the component (B) of the present invention, Comparative Example 2 is a sample which has a hydroxyl group amount of lower than 0.1 mol % corresponding to the component (B) of the present invention, Comparative Example 3 is a sample which does not contain a $SiO_{4/2}$ unit and a $(R^1)_2SiO_{2/2}$ unit corresponding to the component (B) of the present invention but contains a $R^1SiO_{3/2}$ unit, and Comparative Example 4 is a sample which has a hydroxyl group amount of higher than 5.0 mol % corresponding to the component (B) of the present invention.

As a result of the present test, it is confirmed that the curable silicone resin composition of the present invention is extremely useful as a silicone resin composition which provides a cured product having high refractive index and excellent mechanical properties, and having a characteristic of not broken by the severe heat cycle test, while maintaining high transparency and excellent heat resistance of the MQ resin.

It must be stated here that the present invention is not restricted to the embodiments shown by the embodiments. The embodiments are merely examples so that any embodiments composed of substantially the same technical concept as disclosed in the claims of the present invention and expressing a similar effect are included in the technical scope of the present invention.

What is claimed is:

1. A curable silicone resin composition comprising:
   (A) an organopolysiloxane containing an aromatic group having two or more alkenyl groups in one molecule, and having a viscosity at 25° C. of 10 to 1,000,000 mPa·s,
   (B) an organopolysiloxane having a resin structure, comprising 10 to 80 mol % of a $SiO_{4/2}$ unit, 1 to 80 mol % of a $(R^1)_2SiO_{2/2}$ unit, and 1 to 60 mol % of a $(R^2)_3SiO_{1/2}$ unit, and containing a SiOH group in one molecule in a range of 0.1 to 5.0 mol %,
   wherein each $R^1$ independently represent an alkenyl group having 2 to 8 carbon atoms, or a substituted or unsubstituted monovalent hydrocarbon group containing no aliphatic unsaturated group, each $R^2$ independently represent an alkenyl group having 2 to 8 carbon atoms, or a substituted or unsubstituted monovalent hydrocarbon group containing no aliphatic unsaturated group, and among the whole $R^2$s contain one or more alkenyl groups,
   (C) an organohydrogenpolysiloxane having two or more hydrogen atoms bonded to a silicon atom in one molecule, and among whole substituents bonded to the silicon atom, 20 to 80 mol % is a phenyl group, and a $SiO_{4/2}$ unit is less than 5 mol %, and
   (D) a platinum group metal catalyst,
   and the component (B) is contained in an amount of 20 to 80% by mass based on a sum of the component (A) and the component (B).

2. The curable silicone resin composition according to claim 1, wherein a refractive index of a cured product thereof is in the range of 1.50 to 1.60.

3. The curable silicone resin composition according to claim 1, wherein the component (C) is contained in such an amount that the SiH group of which becomes 0.1 to 4.0 mol based on 1 mol of the alkenyl group contained in the component (A) and the component (B).

4. The curable silicone resin composition according to claim 2, wherein the component (C) is contained in such an amount that the SiH group of which becomes 0.1 to 4.0 mol based on 1 mol of the alkenyl group contained in the component (A) and the component (B).

* * * * *